United States Patent
Osawa et al.

(10) Patent No.: US 11,330,528 B2
(45) Date of Patent: May 10, 2022

(54) TERMINAL AND RADIO COMMUNICATION METHOD USING A PLURALITY OF WAVEFORMS

(71) Applicant: NTT DOCOMO, INC., Tokyo (JP)

(72) Inventors: Ryosuke Osawa, Tokyo (JP); Kazuki Takeda, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 269 days.

(21) Appl. No.: 16/469,410

(22) PCT Filed: Dec. 14, 2017

(86) PCT No.: PCT/JP2017/044819
§ 371 (c)(1),
(2) Date: Jun. 13, 2019

(87) PCT Pub. No.: WO2018/110620
PCT Pub. Date: Jun. 21, 2018

(65) Prior Publication Data
US 2020/0100186 A1 Mar. 26, 2020

(30) Foreign Application Priority Data
Dec. 15, 2016 (JP) .............................. JP2016-243299

(51) Int. Cl.
*H04W 52/14* (2009.01)
*H04W 52/26* (2009.01)
*H04W 52/36* (2009.01)

(52) U.S. Cl.
CPC ....... *H04W 52/146* (2013.01); *H04W 52/262* (2013.01); *H04W 52/365* (2013.01); *H04W 52/367* (2013.01)

(58) Field of Classification Search
CPC ............ H04W 52/146; H04W 52/262; H04W 52/365; H04W 52/367; H04L 27/26
See application file for complete search history.

(56) References Cited

U.S. PATENT DOCUMENTS

| 9,065,618 B2 * | 6/2015 | Iwai ...................... H04L 5/0053 |
| 2002/0065095 A1 * | 5/2002 | Kobayashi ............ H04W 52/52 455/522 |

(Continued)

FOREIGN PATENT DOCUMENTS

| WO | 2014/013894 A1 | 1/2014 | |
| WO | 2014/027573 A1 | 2/2014 | |
| WO | WO-2015045958 A1 * | 4/2015 | ............ H04W 72/04 |

OTHER PUBLICATIONS

International Search Report issued in PCT/JP2017/044819 dated Mar. 6, 2018 (2 pages).

(Continued)

*Primary Examiner* — Mounir Moutaouakil
(74) *Attorney, Agent, or Firm* — Osha Bergman Watanabe & Burton LLP

(57) ABSTRACT

Communication is suitably continued even when communication is performed by using a plurality of waveforms. A user terminal according to one aspect of the present invention includes: a transmission section that transmits a first signal and a second signal by using respectively different radio resources, the first signal conforming to a first transmission scheme-based waveform and the second signal conforming to a second transmission scheme-based waveform; and a control section that performs transmit power control on a signal to be transmitted.

14 Claims, 10 Drawing Sheets

(56) References Cited

U.S. PATENT DOCUMENTS

| | | | | |
|---|---|---|---|---|
| 2007/0176681 A1* | 8/2007 | Matsumoto | ............ | H03G 3/3042 330/278 |
| 2010/0189193 A1* | 7/2010 | Miura | ................. | H04L 27/2017 375/308 |
| 2013/0028204 A1* | 1/2013 | Dinan | ................... | H04L 5/0098 370/329 |
| 2013/0210500 A1* | 8/2013 | Graham | ................ | H04W 52/30 455/571 |
| 2014/0177531 A1* | 6/2014 | Imamura | ............... | H04L 5/0094 370/328 |
| 2014/0177602 A1* | 6/2014 | Chen | ..................... | H04W 52/04 370/336 |
| 2015/0173079 A1* | 6/2015 | Yokomakura | ........... | H04L 5/001 370/329 |
| 2015/0223177 A1 | 8/2015 | Hayashi et al. | | |
| 2015/0358921 A1* | 12/2015 | Karlsson | ............... | H04L 5/0073 370/252 |
| 2016/0242127 A1* | 8/2016 | Takeda | ................ | H04W 52/365 |
| 2020/0252879 A1* | 8/2020 | Palenius | ............ | H04W 52/143 |

OTHER PUBLICATIONS

Written Opinion of the International Searching Authority issued in PCT/JP2017/044819 dated Mar. 6, 2018 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Qualcomm Incorporated; "UL waveform configuration"; 3GPP TSG-RAN WG1 #87, R1-1612075; Reno, USA; Nov. 14-18, 2016 (6 pages).

Extended European Search Report issued in Application No. 17880321.9, dated Jul. 1, 2020 (7 pages).

Office Action issued in counterpart Indian Application No. 201917023766 dated Sep. 28, 2021 (7 pages).

Office Action issued in counterpart Chinese Application No. 201780085978.4 dated Sep. 29, 2021 (15 pages).

\* cited by examiner

TERMINAL AND RADIO COMMUNICATION METHOD USING A PLURALITY OF WAVEFORMS

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified. LTE successor systems (referred to as, for example, Future Radio Access (FRA), the 5th generation mobile communication system (5G), New Radio (NR), New radio access (NX), Future generation radio access (FX) or LTE Rel. 13, 14, 15 or subsequent releases) have been also studied.

LTE Rel. 10/11 have introduced Carrier Aggregation (CA) that aggregates a plurality of Component Carriers (CC) to obtain a wider band. A system band of LTE Rel. 8 is one unit that composes each CC. Furthermore, according to CA, a plurality of CCs of an identical radio base station (referred to as, for example, an eNB: eNodeB or a Base Station (BS)) are configured to a user terminal (UE: User Equipment).

On the other hand, LTE Rel. 12 has introduced Dual Connectivity (DC), too, that configures a plurality of Cell Groups (CGs) to UEs. Each cell group includes at least one cell (CC). DC aggregates a plurality of CCs of the different radio base stations, and therefore DC is also referred to as inter-base station CA (Inter-eNB CA).

Furthermore, LTE Rel. 8 to 12 have introduced Frequency Division Duplex (FDD) that performs DownLink (DL) transmission and UpLink (UL) transmission in different frequency bands, and Time Division Duplex (TDD) that temporarily switches and performs downlink transmission and uplink transmission in the same frequency band.

CITATION LIST

Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and NR) are expected to realize various radio communication services while meeting respectively different request conditions (e.g., an ultra high speed, a large volume or ultra low latency).

For example, it is studied for NR to provide radio communication services that are referred to as enhanced Mobile Broad Band (eMBB), massive Machine Type Communication (mMTC) and Ultra Reliable and Low Latency Communications (URLLC).

It is studied for NR to support two types of transmission scheme-based waveforms for uplink. Furthermore, it is studied for NR to support open loop transmit power control and closed loop transmit power control for uplink.

However, specific power control methods of respective waveforms are not yet studied. If appropriate power control is not performed on each waveform, there is a risk that transmit power becomes too high or too little during, for example, switching of each waveform. In this case, there is a problem that a communication throughput and received quality deteriorate, and it is difficult to continue communication.

The present invention has been made in light of this point, and one of objects of the present invention is to provide a user terminal and a radio communication method that can suitably continue communication even when performing communication by using a plurality of waveforms.

Solution to Problem

A user terminal according to one aspect of the present invention includes: a transmission section that transmits a first signal and a second signal by using respectively different radio resources, the first signal conforming to a first transmission scheme-based waveform and the second signal conforming to a second transmission scheme-based waveform; and a control section that performs transmit power control on a signal to be transmitted.

Advantageous Effects of Invention

According to the present invention, it is possible to suitably continue communication even when performing communication by using a plurality of waveforms.

DESCRIPTION OF EMBODIMENTS

NR is scheduled to support two types of different transmission schemes (that may be referred to as a multiplexing scheme, a modulation scheme, an access scheme and a waveform scheme)-based waveform for uplink for use in at least eMBB. These two types of waveforms are, more specifically, a Cyclic Prefix Orthogonal Frequency Division Multiplexing (CP-OFDM)-based waveform and a Discrete Fourier Transform Spread Orthogonal Frequency Division Multiplexing (DFT-S-OFDM)-based waveform.

In addition, the waveform may be characterized according to whether or not DFT precoding (spreading) is applied to the OFDM waveform. For example, CP-OFDM may be referred to as a waveform (signal) to which DFT precoding is not applied, and DFT-S-OFDM may be referred to as a waveform (signal) to which DFT precoding is applied.

It is assumed for NR to switch and use CP-OFDM and DFT-S-OFDM, and therefore the waveform is supposed to switch during communication. For example, a network (a base station (also referred to as a gNB)) may instruct to a UE which one of the CP-OFDM-based waveform and the DFT-S-OFDM-based waveform to use (or switching of the waveform). The instruction may be notified to the UE by higher layer signaling, physical layer signaling (e.g., Downlink Control Information (DCI)) or a combination of these.

For higher layer signaling, for example, Radio Resource Control (RRC) signaling, Medium Access Control (MAC) signaling (e.g., a MAC Control Element (MAC CE)), broadcast information (a Master Information Block (MIB) or a System Information Block (SIB)) may be used.

Figure 1:
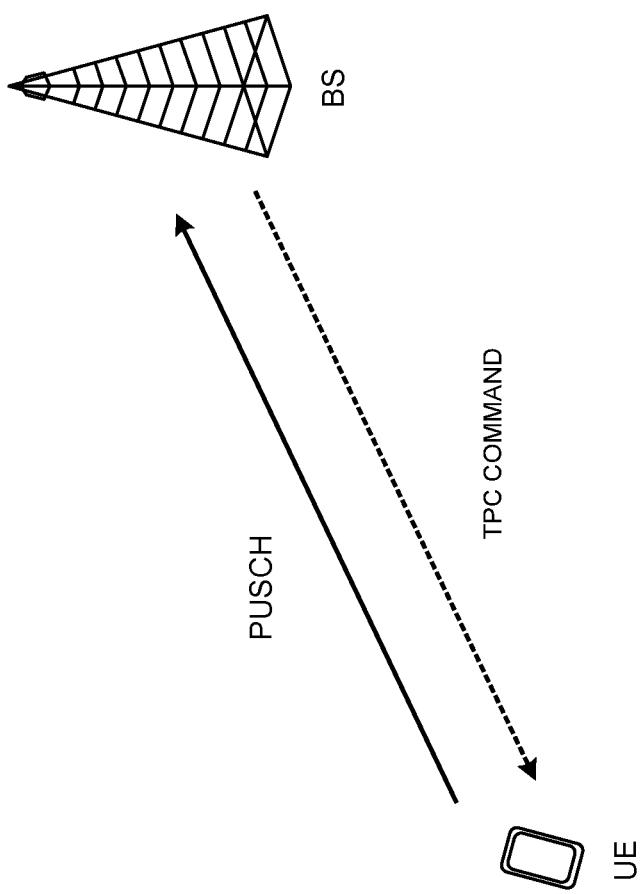
FIG. 1 is a diagram illustrating one example of transmit power control of legacy LTE.

By the way, uplink of legacy LTE (e.g., LTE Rel. 13) that uses DFT-S-OFDM supports open loop transmit power control and closed loop transmit power control. FIG. 1 is a diagram illustrating one example of transmit power control of legacy LTE. According to uplink transmit power control of LTE (transmit power control of an uplink shared channel (PUSCH: Physical Uplink Shared Channel) in FIG. 1), an open loop control error is corrected by closed loop control that uses a TPC command received from a base station.

According to, for example, legacy LTE, PUSCH transmit power $P_{PUSCH,c}(i)$ in a subframe i of a serving cell c is expressed by following equation 1.

[Mathematical 1]

[Mathematical 1]

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$ (Equation 1)

In equation 1, $P_{CMAX,c}(i)$ represents maximum transmissible power (permitted maximum transmit power) of a UE, $M_{PUSCH,c}(i)$ represents a transmission bandwidth (the number of resource blocks) of a PUSCH, j represents an index indicating a scheduling type of the PUSCH, $P_{O\_PUSCH,c}(j)$ represents a value corresponding to target received power of the PUSCH, $\alpha_c(j)$ is a coefficient multiplied on $PL_c$, $PL_c$ represents downlink path-loss computed by the UE, $\Delta_{TF,c}(i)$ represents an offset value corresponding to a transmission format, and f (i) is a correction value (e.g., a TPC command cumulative value or an offset amount based on the TPC command) of a Transmit Power Control (TPC) command. For example, $P_{O\_PUSCH,c}(j)$ and $\alpha_c(j)$ may be notified by broadcast information.

In equation 1, parameters related to open loop control are $M_{PUSCH,c}(i)$, $P_{O\_PUSCH,c}(j)$, $\alpha_c(j)$, $PL_c$ and $\Delta_{TF,c}(i)$. Furthermore, a parameter related to closed loop control is $f_c(i)$. That is, PUSCH transmit power has an upper limit that is maximum transmissible power of the UE, and is determined by open loop control and closed loop control.

In addition, although other uplink signals (e.g., an uplink control channel (PUCCH: Physical Uplink Control Channel) and an uplink measurement reference signal (SRS: Sound Reference Signal)) also differ in parameters to use, transmit power is determined based on open loop control and closed loop control likewise for the other uplink signals.

On the other hand, it is studied for NR to support open loop transmit power control and closed loop transmit power control for uplink for use in at least eMBB. In this regard, transmit power control of a CP-OFDM-based waveform on uplink is also supposed to be performed in a mode as in equation 1 similar to a DFT-S-OFDM-based waveform. However, specific power control methods of respective waveforms are not yet considered.

There is a problem that, if appropriate power control is not performed on each waveform, during, for example, switching of each waveform, the transmit power does not become appropriate transmit power that satisfies target received quality (e.g., Signal to Interference plus Noise Ratio (SINR)), and a communication throughput and received quality deteriorate.

Furthermore, DFT-S-OFDM has a lower Peak to Average Power Ratio (PAPR) than that of CP-OFDM (this also means that a cubic metric that is an approximate calculation formula of the PAPR is low), and therefore can permit higher transmit power. If control is not performed by taking this difference into account, there is naturally a problem that a communication throughput deteriorates.

Hence, the inventors of the present invention have conceived a method for determining transmit power of each waveform in a case where a plurality of waveforms are switched and used. Consequently, even when the waveform is switched, it is possible to appropriately determine transmit power, and suitably continue communication.

The embodiments according to the present invention will be described in detail below with reference to the drawings. A radio communication method according to each embodiment may be applied alone or may be applied in combination.

In addition, "switching of the waveform" may be read as "transmitting a first signal that conforms to a first transmission scheme (e.g., CP-OFDM)-based waveform and a second signal that conforms to a second transmission scheme (e.g., DFT-S-OFDM)-based waveform by respectively different radio resources (e.g., time and/or frequency resources)". Furthermore, the "waveform" may be read as a "waveform signal", a "signal that conforms to a waveform" and a "signal waveform".

Radio Communication Method

First Embodiment

According to the first embodiment of the present invention, a UE may perform independent transmit power control per waveform (embodiment 1.1) or may perform common transmit power irrespectively of waveforms (embodiment 1.2). Transmit power control according to the first embodiment may be performed based on parameters used for uplink transmit power control of legacy LTE as expressed in equation 1 or may be performed by taking into account parameters that are not used by uplink transmit power control of legacy LTE.

For example, transmit power control may be performed on each waveform by using an offset (that is also referred to as a waveform specific offset or an offset that takes a waveform into account) that is specific to a waveform. The waveform specific offset may be configured to one or a plurality of waveforms, or may not be configured to any waveform.

In addition, in the following embodiment, the parameter related to closed loop control and the parameters related to open loop control may be read as parameters that are related to each loop control used by legacy LTE (e.g., LTE Rel. 8 to 13) and/or parameters that are not yet defined by legacy LTE.

[TPC Command is Commonly Used]

In the first embodiment, a correction value (e.g., $f_c(i)$ of equation 1) based on a TPC command may be commonly used (the same value may be used for both types of the transmit power control) for transmit power control of each of a plurality of waveforms. Consequently, even when a waveform is switched, it is possible to take over correction information of closed loop control, and suitably perform transmit power control that satisfies the target SINR.

Figure 2A:
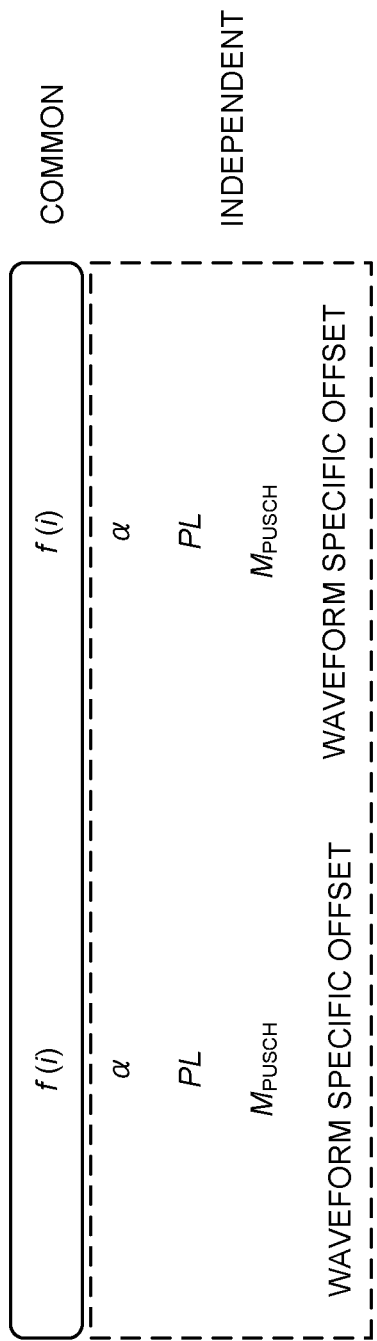
FIGS. 2A and 2B are conceptual diagrams of transmit power control according to a first embodiment.
Figure 2B:
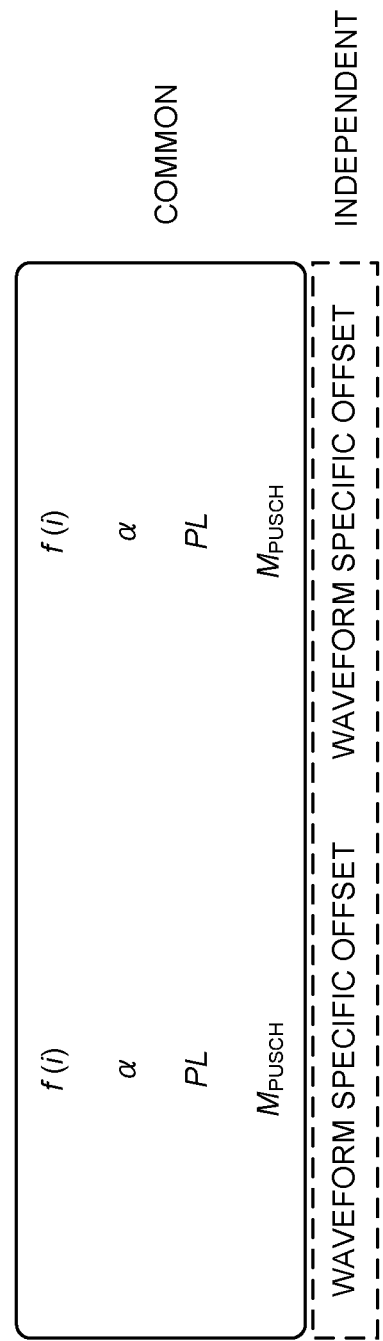

FIGS. 2A and 2B are conceptual explanatory diagrams of transmit power control according to the first embodiment. In addition, this example will describe a variable and a waveform specific offset indicated in equation 1 and used by LTE as an example of control parameters, yet is not limited to this. Furthermore, although this example omits indications of "$_c$", "(i)" and "(j)" of the parameters, a person skilled in the art can refer to the parameters of legacy LTE and understand the meanings.

FIG. 2A is a diagram illustrating one example indicating whether parameters related to transmit power control of each waveform according to the embodiment 1.1 are common or independent between waveforms. In this example, the UE commonly uses the parameter (a correction value based on a TPC command in this case) related to closed loop control, and independently uses the parameters ($\alpha$, PL, $M_{PUSCH}$ and the waveform specific offset) related to open loop control for transmit power control of a plurality of waveforms. The parameters that are independent between waveforms may be configured to the UE per waveform.

FIG. 2B is a diagram illustrating another example indicating whether the parameters related to transmit power control of each waveform according to the embodiment 1.1 are common or independent between waveforms. In this example, the UE commonly uses both of the parameter (a correction value based on a TPC command in this case) related to closed loop control and parameters (a, PL and $M_{PUSCH}$) related to open loop control, and independently uses a waveform specific offset that is not yet defined by legacy LTE for transmit power control of a plurality of waveforms.

Furthermore, according to the embodiment 1.2, the UE commonly uses all of the parameter related to closed loop control, the parameters related to open loop control and the waveform specific offset for transmit power control of a plurality of waveforms.

Figure 3:
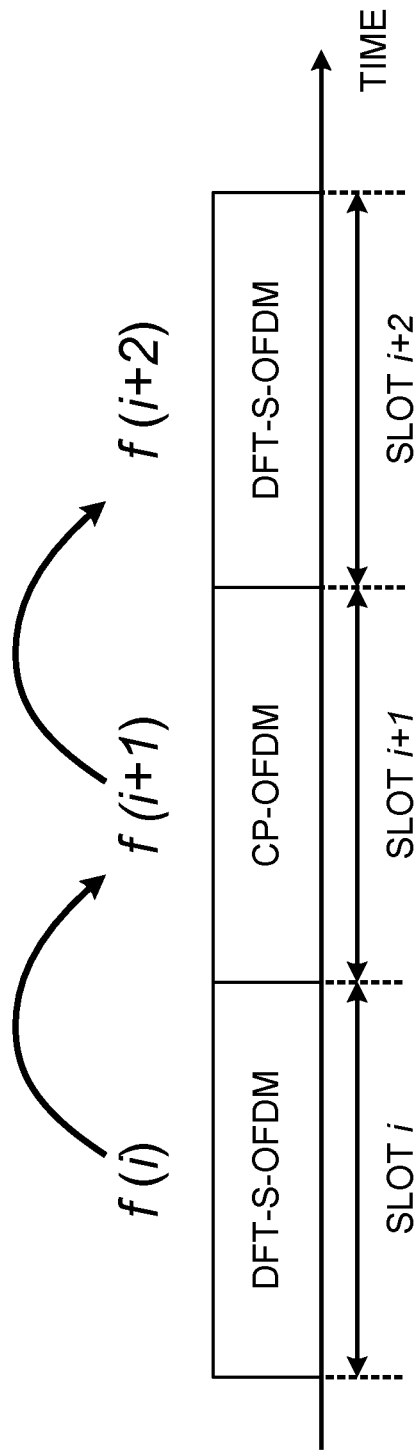
FIG. 3 is a diagram illustrating one example where a correction value based on a TPC command is commonly used for a plurality of waveforms according to the first embodiment.

FIG. 3 is a diagram illustrating one example where a correction value based on a TPC command is commonly used for a plurality of waveforms according to the first embodiment. In this example, the UE uses DFT-S-OFDM for transmission in slots i and i+2, and uses CP-OFDM for transmission in a slot i+1. In addition, a waveform may be switched in units of slots as illustrated in FIG. 3 or may be switched in units of radio frames, units of subframes or units of mini slots. Furthermore, units of transmit power computation as in equation 1 may be units of slots or units of mini slots and may not be units of subframes. For example, i in equation 1 represents a slot. Furthermore, switching of a waveform is not limited to that in FIG. 3.

When the correction value (f(i)) based on the TPC command is commonly used, the correction value is taken over even when the waveform is switched. That is, the UE updates the correction value by using a latest correction value for transmit power control irrespectively of a waveform. In this case, it is possible to prevent deterioration of characteristics during switching of the waveform compared to a case where f(i) is reset. In addition, the correction value may be updated based on a correction value (e.g., a correction value that is two subframes before) that is not the latest correction value.

In a case of FIG. 3, the UE controls power based on same f(i) even when using one of DFT-S-OFDM and CP-OFDM. For example, in the slot i+1, transmit power of a CP-OFDM-based waveform is determined by using f(i) of the slot i and f(i+1) calculated from the TPC command.

In addition, parameters related to maximum transmit power such as permitted maximum transmit power (e.g., $P_{CMAX}$) of the UE and permitted maximum transmit power (e.g., $P_{CMAX,c}$) per CC may be configured per waveform or a common value between a plurality of waveforms may be used for the parameters.

A parameter of a predetermined waveform (at least one of the parameter related to closed loop control, the parameters related to open loop control and the waveform specific offset) may be notified to the UE by higher layer signaling (e.g., RRC signaling, an MAC header or an MAC CE), physical layer signaling (e.g., DCI) or a combination of these, or may be defined as a fixed value by a specification. Furthermore, the parameter of the predetermined waveform may be configured by a relative value based on a parameter of another waveform.

[TPC Command is Independently Used]

In a modified example of the embodiment 1.1, a correction value based on a TPC command may be independently used (individual values may be used for both types of the transmit power control) for transmit power control of each of a plurality of waveforms.

Figure 4:
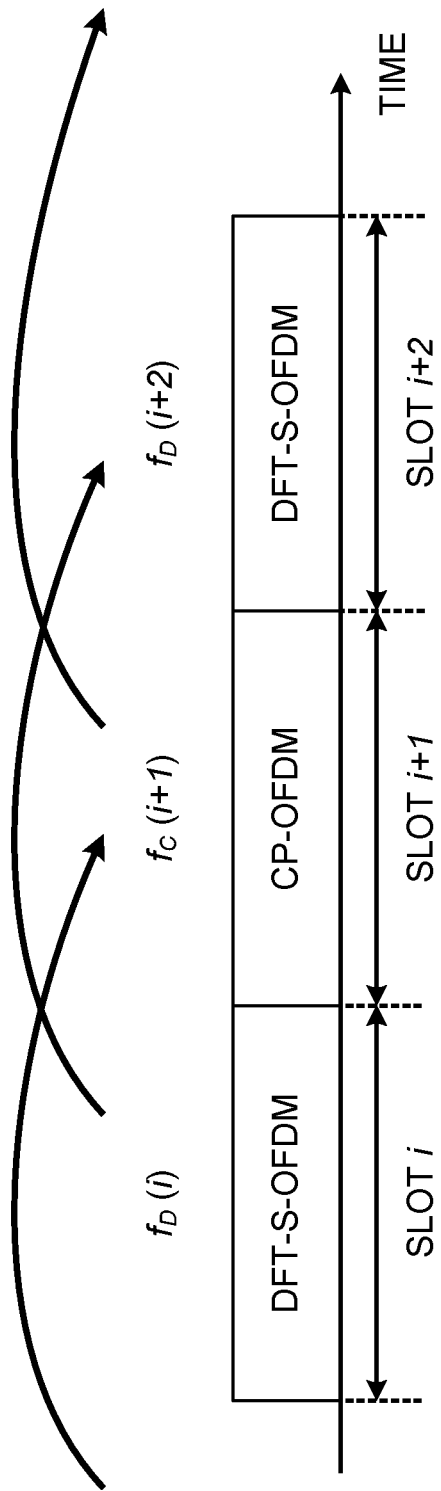
FIG. 4 is a diagram illustrating one example where a correction value based on a TPC command is independently used for each of a plurality of waveforms according to the first embodiment.

FIG. 4 is a diagram illustrating one example where the correction value based on the TPC command is independently used for each of a plurality of waveforms according to the first embodiment. FIG. 4 assumes the same switching as that in FIG. 3.

In this case, the correction value ($f_D(i)$) based on the TPC command for DFT-S-OFDM and the correction value ($f_C(i)$) based on the TPC command for CP-OFDM are used. During switching of the waveform, a correction value of a different waveform is not taken over.

That is, the UE updates the correction value by using the latest correction value per waveform (i.e., for the identical waveform) during transmit power control. In this case, it is possible to prevent deterioration of characteristics compared to a case where the correction value based on the TPC command is reset during switching of the waveform. In addition, the correction value may be updated based on a correction value (e.g., a correction value used to compute transmit power that is two times before) that is not the latest correction value.

In a case of FIG. 4, the UE performs power control based on $f_D(i)$ when using DFT-S-OFDM, and performs power control based on $f_C(i)$ when using CP-OFDM. For example, transmit power of a DFT-S-OFDM-based waveform in the slot i+2 is determined by using $f_D(i)$ of the slot i and $f_D(i+2)$ calculated from the TPC command.

[Correction of Correction Value of TPC Command that Takes Waveform Specific Offset into Account]

When a plurality of waveforms are switched and used, there is supposed a case where transmit power becomes non-contiguous before and after switching (e.g., a case where a waveform specific offset is a different value per waveform when a TPC command is commonly used). To solve this problem, the UE may correct a correction value of a TPC command that takes into account at least one of the waveform specific offset and open loop parameters. For example, the UE may decrease the correction value (e.g., f(i)) based on the TPC command by a difference of the waveform specific offset. The difference of the waveform specific offset may be subtracted from f(i) (or added to f(i)) such that transmit power is contiguous during switching of the waveform.

Furthermore, the UE may correct the correction value of the TPC command that takes a beam gain into account based on a similar idea. For example, a beam gain (or a difference of the beam gain) may be subtracted from f(i) (or may be added to f(i)) such that, when a beam is switched from off to on (or when the beam is switched from on to off or when the beam is changed to a different beam), a value (e.g., a sum of transmit power and the beam gain) that takes into account both of the transmit power and the beam gain is contiguous.

In addition, the UE may notify the base station of information (e.g., the waveform and/or the difference subtracted (or added) by beam switching) related to correction of the correction value of the TPC command and information of the beam gain by higher layer signaling (e.g., RRC signaling, an MAC header or an MAC CE), physical layer signaling (e.g., Uplink Control Information (UCI)) or a combination of these.

By correcting the correction value of the TPC command in this way, it is possible to widen a range of a value of transmit power that can be taken compared to a case where a difference is not given to the waveform specific offset.

[Timing to Reset Correction Value of TPC Command]

In legacy LTE systems, the base station calculates pathloss based on a power margin (also referred to as a Power Headroom (PH) or a UE Power Headroom (UPH)) notified from the UE, and determines the TPC command. The UE includes the UPH in the Power Headroom Report (PHR) to transmit. A TPC command cumulative value (e.g., f(i)) is calculated by each of the base station and the UE, and therefore there is a difference between an f(i) value recognized by the base station and an f(i) value recognized by the UE in some cases (e.g., a case where the UE has failed receiving the TPC command).

When there is the difference in the f(i) value, the base station cannot appropriately estimate path-loss. Hence, according to legacy LTE, the base station and/or the UE reset the f(i) value in the following cases: (1) a case where $P_{o\_PUSCH}$ is reset, and (2) a case where uplink connection is reestablished by using handover. According to the embodiment of the present invention, the correction value based on the TPC command may be reset in cases different from these cases.

When, for example, the correction value based on the TPC command is commonly used, if the correction value related to one of (one or more) waveforms is reset, a correction value related to another waveform may be also reset. Furthermore, when a correction value related to a specific waveform is reset, correction values related to other waveforms may be also reset. By resetting the correction values at these timings, it is possible to reset the correction values at an earlier timing, so that it is possible to correct mismatch of recognition of the correction values between the base station and the UE earlier.

When the correction value based on the TPC command is independently used, if the correction value related to one of (one or more) waveforms is reset, the correction values related to the other waveforms may be also reset. Furthermore, when the correction value related to the specific waveform is reset, the correction values related to the other waveforms may not be reset (a correction value reset timing may be independent per waveform).

In addition, irrespectively of whether or not the correction value based on the TPC command is commonly used, the correction value may be reset on an opportunity that the predetermined parameter (e.g., waveform specific offset) is reset.

[Default Waveform]

When a waveform that is actually used by the UE and a waveform that the base station assumes the UE uses do not match, the base station cannot appropriately estimate pathloss or perform demodulation. Furthermore, when the base station performs reception processing assuming a plurality of waveforms, a processing amount becomes enormous and is not preferable. To support this case, it is preferable to define a default waveform. When specific conditions are satisfied, the UE can prevent erroneous transmit power control from continuing by using (falling back) the default waveform (e.g., DFT-S-OFDM-based waveform).

In this regard, the above specific conditions may include that, for example, the number of times of uplink retransmission (the number of times of uplink transmission) exceeds a predetermined value, the specific conditions may be triggered by DCI (e.g., UL grant) notified by a common search space, or may be triggered by predetermined information by higher layer signaling (e.g., RRC signaling or broadcast information). Furthermore, the above specific conditions may be defined by the specification. By, for example, triggering the specific conditions by the DCI notified by the common search space, it is possible to fall back a waveform of a specific UE.

Furthermore, the default waveform may be notified to the UE by higher layer signaling (e.g., RRC signaling or broadcast information), physical layer signaling (e.g., DCI) or a combination of these, or may be defined by the specification.

[Transmit Power Control During CA]

When using CA, the UE may apply a different waveform per CC or may use the same waveform between a plurality of CCs. In this case, transmit power control (embodiment 1.1.) that is independent per waveform may be performed per CC, or transmit power control (embodiment 1.2.) that is common irrespectively of a waveform may be performed between a plurality of CCs. In addition, when the same waveform is used for a plurality of CCs, a different value may be configured to the same parameter in these CCs.

In addition, the UE may perform identical transmit power control (e.g., power control based on the embodiment 1.1) on a plurality of CCs of contiguous frequency bands, or may perform identical transmit power control on a plurality of non-contiguous CCs.

According to the above-described first embodiment, even when switching a transmission waveform, the UE can appropriately determine transmit power.

Second Embodiment

According to the second embodiment of the present invention, a UE and a base station share information indicating which waveform UE supposes (transmit power of which waveform the UE uses) to calculate a UPH. Consequently, even when the UE performs independent transmit power control per waveform, the base station can accurately estimate path-loss in the UE based on the UPH, and transmit an appropriate TPC command.

In the second embodiment, the waveform supposed for UPH calculation may be fixed (a specific waveform may be supposed for UPH calculation) (embodiment 2.1). Furthermore, in the second embodiment, the waveform supposed for UPH calculation may dynamically fluctuate (embodiment 2.2).

According to the embodiment 2.1, the UE may calculate the UPH supposing a specific waveform irrespectively of a waveform in use (or transmitted). Information related to the specific waveform supposed for UPH calculation may be notified to the UE by higher layer signaling (e.g., RRC signaling, an MAC header or an MAC CE), physical layer signaling (e.g., DCI) or a combination of these, or may be defined by a specification.

In addition, according to UPH calculation, parameters related to maximum transmit power such as permitted maximum transmit power (e.g., $P_{CMAX}$) of the UE and permitted maximum transmit power (e.g., $P_{CMAX,c}$) per CC may be used for the specific waveform supposed for UPH calculation.

According to the embodiment 2.2, the UE may calculate the UPH supposing the waveform in use (or transmitted). Furthermore, the UE may calculate the UPH supposing one of waveforms. In this case, the UE may notify the base station of information related to the waveform supposed for UPH calculation by higher layer signaling (e.g., RRC signaling, an MAC header or an MAC CE), physical layer signaling (e.g., UCI) or a combination of these. For example, the UE may include the information in a PHR to notify.

In addition, the PHR including the information related to the waveform supposed for UPH calculation may include in an MAC header a Logical Channel Identifier (LCID) value (i.e., the LCID value indicating that the information related to the waveform supposed for UPH calculation is included) different from an LCID value corresponding to the PHR defined by legacy LTE (e.g., LTE Rel. 13).

The PHR may include a UPH related to one waveform or UPHs related to a plurality of waveforms.

According to the above-described second embodiment, even when the UE switches a transmission waveform, the base station can accurately estimate path-loss of the UE based on the UPH.

[Modified Example of Second Embodiment]

In addition, the UE may transmit information of estimated path-loss (e.g., PL in equation 1) to the base station. The path-loss does not depend on a transmission waveform of the UE. Consequently, by using information of the path-loss notified from the UE, the base station can grasp the path-loss related to the UE irrespectively of a waveform used by the UE (and/or even when recognition of a correction value based on the TPC command differs from that of the UE).

Instead of the information of the path-loss or in addition to the information of the path-loss, the UE may notify indirect information such as received power (e.g., Reference Signal Received Power (RSRP)), uplink transmit power and a transmission beam gain that can be used to compute the path-loss. The UE may notify the base station of the information by higher layer signaling (e.g., RRC signaling, an MAC header or an MAC CE), physical layer signaling (e.g., UCI) or a combination of these.

The base station grasps the downlink reference signal transmit power and consequently can calculate (estimate) path-loss (e.g., DL path-loss) based on RSRP notified from the UE. In this case, the UE may notify a transmission beam gain by subtracting the transmission beam gain from the RSRP (or by adding the transmission beam gain to the RSRP) or may notify the transmission beam gain in addition to the RSRP.

In addition, instead of the RSRP (or in addition to the RSRP), the UE may notify the base station of at least one of received quality (e.g., Reference Signal Received Quality (RSRQ), a Signal to Interference plus Noise Ratio (SINR) or a Signal to Noise Ratio (SNR)) and a signal strength (e.g., a Received Signal Strength Indicator (RSSI)), and the base station may calculate path-loss based on the notified information. When notifying the base station of the RSSI, the UE preferably notifies at least one of the RSRQ, the SINR and the SNR. In this case, the base station may estimate the path-loss based on the RSSI and the RSRQ (or the SINR or the SNR).

In addition, the downlink reference signal may be a reference signal such as a Cell-specific Reference Signal (CRS), a Channel State Information Reference Signal (CSI-RS), and a DeModulation Reference Signal (DMRS) defined by legacy LTE, a signal that is obtained by extending/changing these signals or a new signal.

The base station can grasp uplink received power and consequently calculate path-loss (e.g., UL path-loss) based on uplink transmit power notified from the UE. In this case, the UE may notify a transmission beam gain by adding the transmission beam gain to the uplink transmit power (or by subtracting the transmission beam gain from the uplink transmit power), or may notify the transmission beam gain in addition to the uplink transmit power.

The base station may determine a TPC command transmitted to the UE based on the path-loss (such as DL path-loss or UL path-loss) related to the UE or may control the transmission waveform of the UE.

In addition, the UE may notify the base station of the information of the waveform in use together with or in addition to the path-loss information or the above indirect information by higher layer signaling (e.g., RRC signaling, an MAC header or an MAC CE), physical layer signaling (e.g., UCI) or a combination of these. Consequently, the base station can grasp a waveform (waveform used for transmission) that the UE currently uses, and can perform more appropriately transmit power control matching the waveform.

Modified Example

In addition, the above embodiments have described an example of CP-OFDM and DFT-S-OFDM as a waveform that can be switched during communication, yet are not limited to these. The present invention is applicable to, for example, cases where at least two of a multicarrier transmission scheme-based waveform, a single carrier transmission scheme-based waveform and other waveforms are switched and used. Furthermore, the present invention is applicable even to a case where a plurality of waveforms based on the same transmission scheme (e.g., a plurality of single carrier transmission schemes-based waveforms) are switched and used.

In addition, the above embodiments have been described assuming PUSCH transmit power control, yet are not limited to these. For example, the same transmit power control method may be used for other uplink signals (a PUSCH and an SRS), too. Furthermore, separate transmit power control methods may be applied according to an uplink signal type. For example, transmit power control may be performed on the PUSCH based on the embodiment 1.1, and the transmit power control may be performed on the PUCCH based on the embodiment 1.2.

(Radio Communication System) The configuration of the radio communication system according to one embodiment of the present invention will be described below. This radio communication system uses one or a combination of the radio communication method according to each of the above embodiments of the present invention to perform communication.

Figure 5:
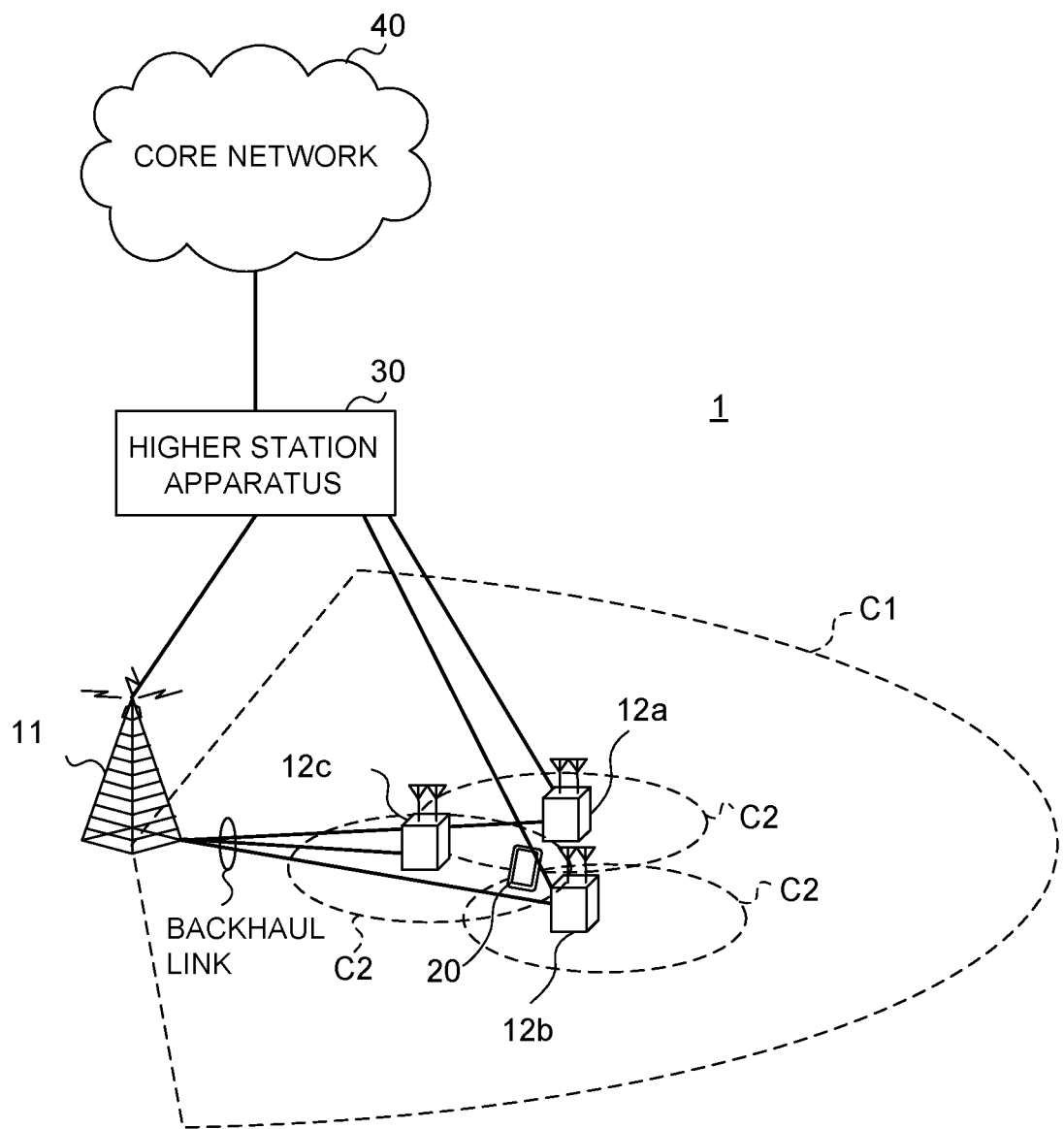
FIG. 5 is a diagram illustrating one example of a schematic configuration of a radio communication system according to one embodiment of the present invention.

FIG. 5 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA) and a New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the number of respective cells and user terminals 20 are not limited to those illustrated in FIG. 5.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH. The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator) and transmission acknowledgement information are transmitted on the PUCCH. A random access preamble for establishing connection with cells is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

Figure 6:
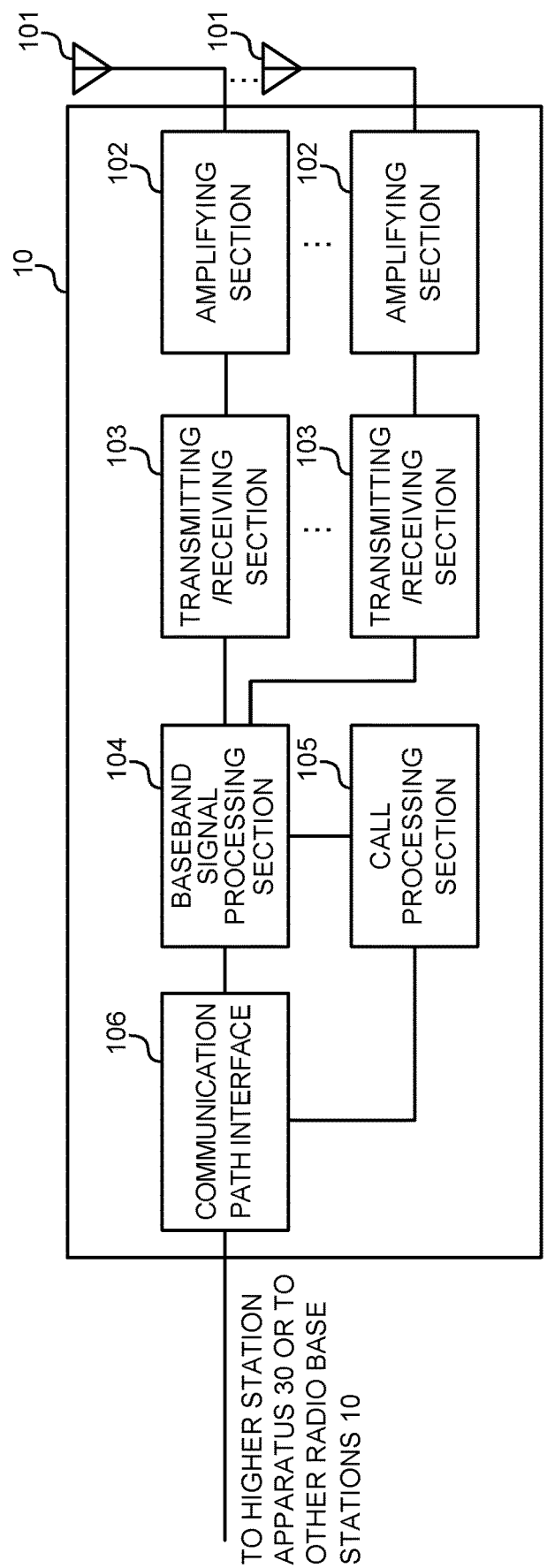
FIG. 6 is a diagram illustrating one example of an overall configuration of a radio base station according to the one embodiment of the present invention.

(Radio Base Station) FIG. 6 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a predetermined interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmission/reception section 103 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 101 can be composed of an array antenna, for example.

Each transmission/reception section 103 may receive from the user terminal 20 the first signal that conforms to the first transmission scheme (e.g., CP-OFDM)-based waveform, and the second signal that conforms to the second transmission scheme (e.g., DFT-S-OFDM)-based waveform by respectively different radio resources (e.g., time and/or frequency resources).

Furthermore, each transmission/reception section 103 may receive information related to correction of a correction value of a TPC command, beam gain information, path-loss information, indirect information that can be used to compute path-loss, information of a used waveform, information related to a waveform supposed for UPH calculation, and a PHR.

Each transmission/reception section 103 may transmit information (e.g., an open loop control parameter such as $P_{O\_PUSCH,c}(j)$) related to transmit power control, information related to a specific waveform supposed for UPH calculation, and a TPC command to the user terminal 20.

Figure 7:
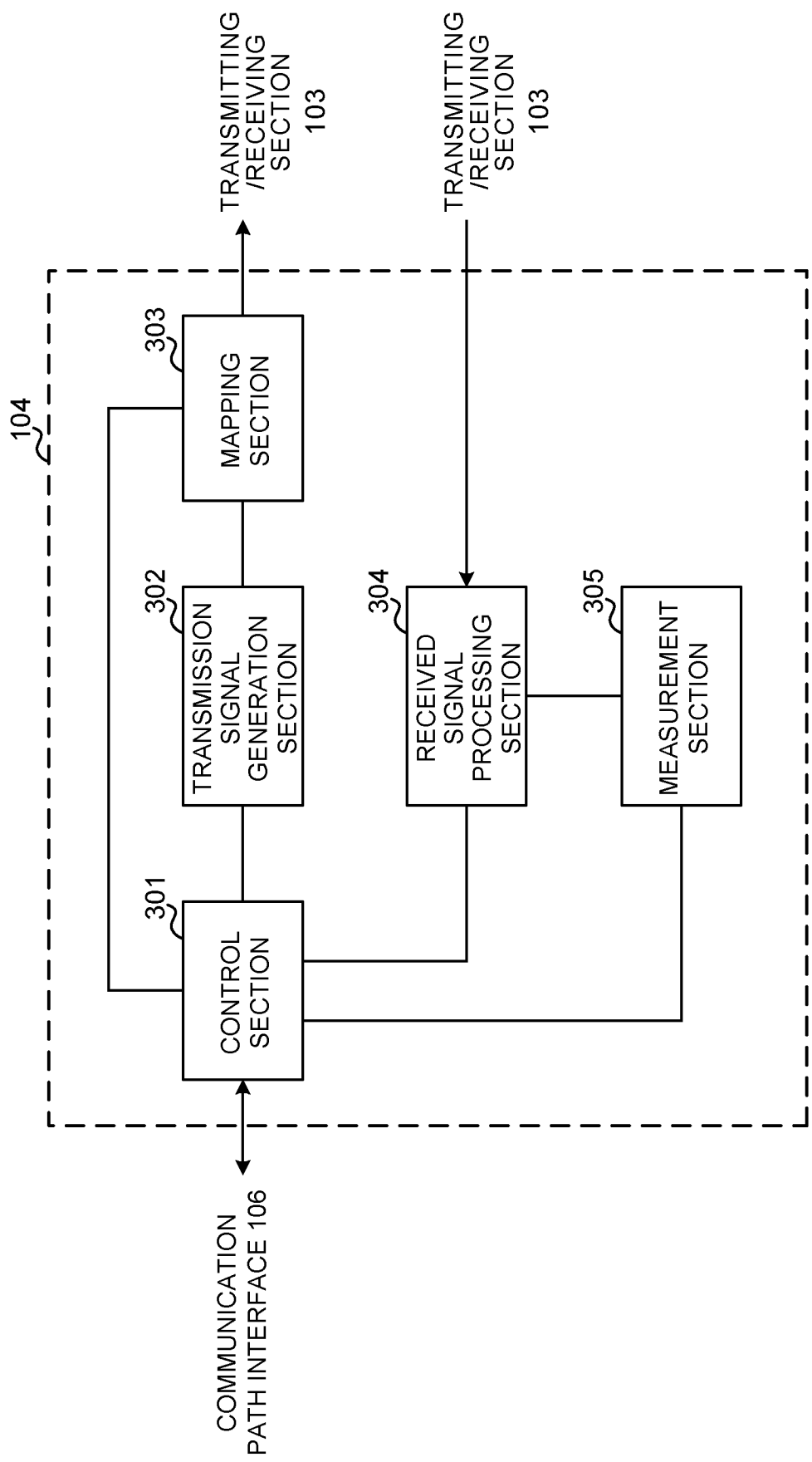
FIG. 7 is a diagram illustrating one example of a function configuration of the radio base station according to the one embodiment of the present invention.

FIG. 7 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on a PUCCH and/or a PUSCH and is transmission acknowledgement information), a random access preamble (e.g., a signal transmitted on the PRACH) and an uplink reference signal.

The control section 301 may perform control to form a transmission beam and/or a reception beam by using digital BF (e.g., precoding) of the baseband signal processing section 104 and/or analog BF (e.g., phase rotation) of each transmission/reception section 103. The control section 301 may perform control to form a beam based on downlink channel information and uplink channel information. These pieces of channel information may be obtained from the received signal processing section 304 and/or the measurement section 305. In addition, transmission that uses the transmission beam may be paraphrased as transmission of a signal to which predetermined precoding has been applied.

The control section 301 may perform control to receive the first signal that conforms to the first transmission scheme (e.g., CP-OFDM)-based waveform, and the second signal that conforms to the second transmission scheme (e.g., DFT-S-OFDM)-based waveform by respectively different radio resources (e.g., time and/or frequency resources). The first signal and the second signal may be signals of a channel of the same type (e.g., a PUSCH or a PUCCH), or may be a signal (e.g., SRS) of the same type.

The control section 301 may perform control to generate information (e.g., TPC command) used for transmit power control of the signal (e.g., the first signal and/or the second signal) transmitted by the user terminal 20, and transmit the information to the user terminal 20.

The control section 301 may estimate path-loss related to a predetermined waveform of the user terminal 20 based on the received PHR and/or indirect information that can be used to compute the path-loss, and determine the TPC command transmitted to the user terminal 20 by using the path-loss. Furthermore, the control section 301 may determine the TPC command transmitted to the user terminal 20 based on received information of the path-loss.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a predetermined radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal and an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., a Received Signal Strength Indicator (RSSI)) or channel information (e.g., CSI). The measurement section 305 may output a measurement result to the control section 301.

(User Terminal)

Figure 8:
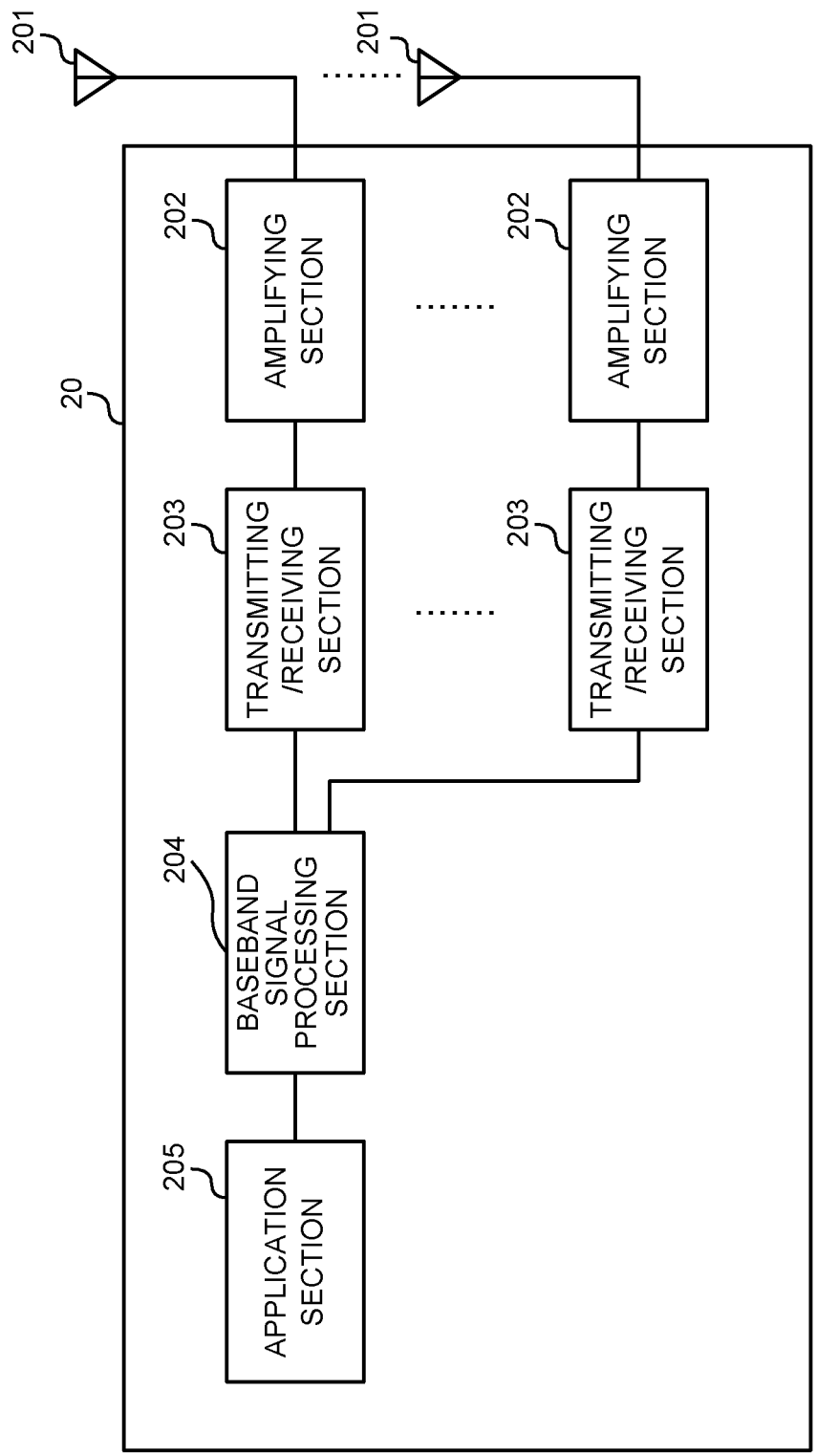
FIG. 8 is a diagram illustrating one example of an overall configuration of a user terminal according to the one embodiment of the present invention.

FIG. 8 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

In addition, each transmission/reception section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 201 can be composed of an array antenna, for example.

Each transmission/reception section 203 may transmit to the radio base station 10 the first signal that conforms to the first transmission scheme (e.g., CP-OFDM)-based waveform and the second signal that conforms to the second transmission scheme (e.g., DFT-S-OFDM)-based waveform by respectively different radio resources (e.g., time and/or frequency resources).

Furthermore, each transmission/reception section 203 may transmit the information related to correction of the correction value of the TPC command, the beam gain information, the path-loss information, the indirect information that can be used to compute the path-loss, the information of the used waveform, the information related to the waveform supposed for UPH calculation, and the PHR.

Each transmission/reception section 203 may receive from the radio base station 10 the information (e.g., the open loop control parameter such as $P_{O\_PUSCH,c}(j)$) related to transmit power control, the information related to the specific waveform supposed for UPH calculation and the TPC command.

Figure 9:
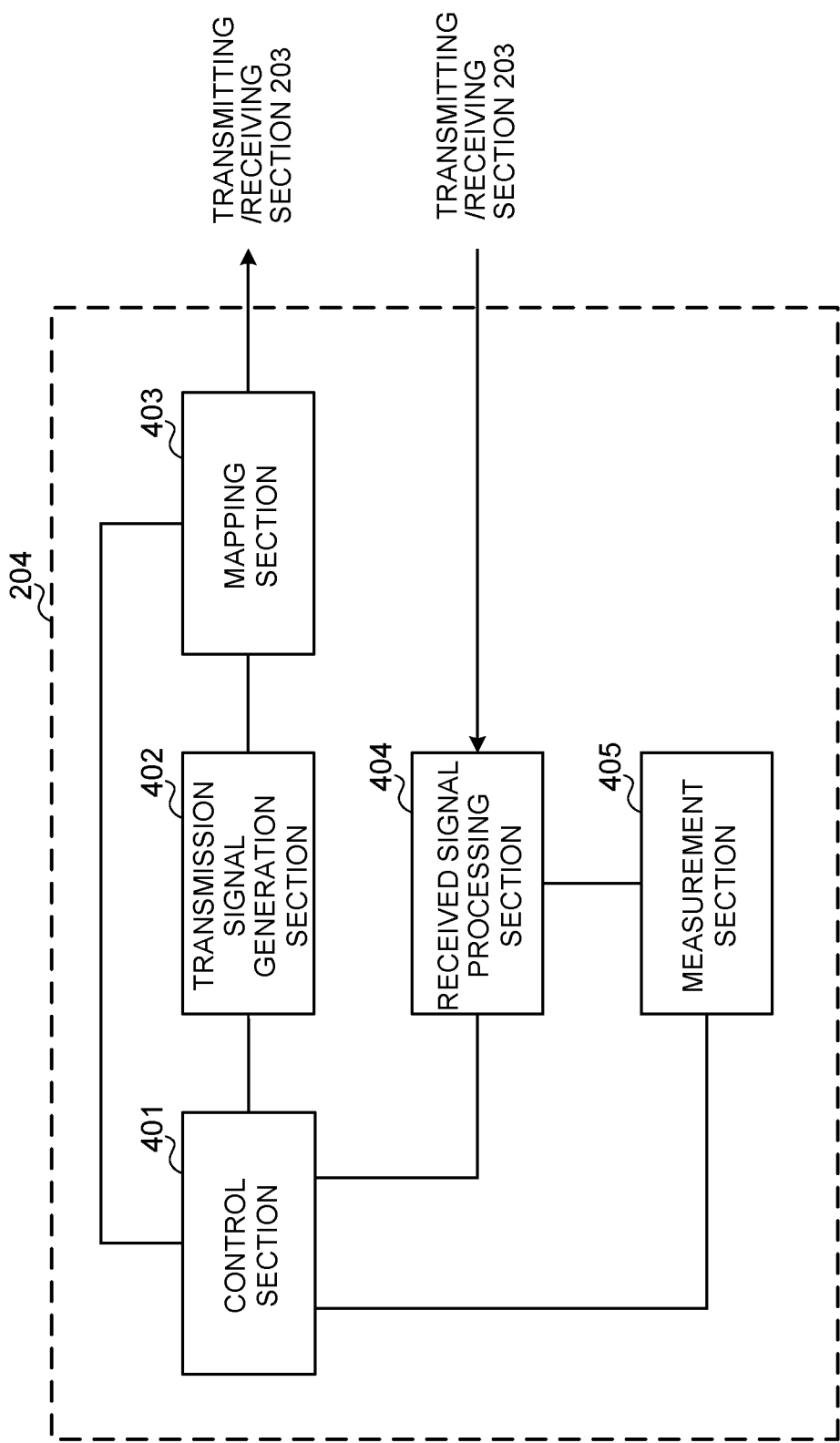
FIG. 9 is a diagram illustrating one example of a function configuration of the user terminal according to the one embodiment of the present invention.

FIG. 9 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains, from the received signal processing section 404, a downlink control signal and a downlink data signal transmitted from the radio base station 10. The control section 401 controls generation of the uplink control signal and/or the uplink data signal based on a result obtained by deciding whether or not it is necessary to perform retransmission control on the downlink control signal and/or the downlink data signal.

The control section 401 may perform control to form the transmission beam and/or the reception beam by using digital BF (e.g., precoding) of the baseband signal processing section 204 and/or analog BF (e.g., phase rotation) of each transmission/reception section 203. The control section 401 may perform control to form a beam based on the downlink channel information and the uplink channel information. These pieces of channel information may be obtained from the received signal processing section 404 and/or the measurement section 405.

The control section 401 may perform control to transmit the first signal that conforms to the first transmission scheme (e.g., CP-OFDM)-based waveform, and the second signal that conforms to the second transmission scheme (e.g., DFT-S-OFDM)-based waveform in the respectively different radio resources (e.g., time and/or frequency resources). The first signal and the second signal may be signals of a channel of the same type (e.g., a PUSCH or a PUCCH), or may be a signal (e.g., SRS) of the same type.

The control section 401 may perform transmit power control on signals (e.g., the first signal and/or the second signal) to transmit. For example, the control section 401 may perform independent transmit power control on each of the first signal and the second signal. Furthermore, the control section 401 may perform common transmit power control on both of the first signal and the second signal.

In this regard, according to the independent transmit power control, at least part of parameters may be used independently and the other parameters may be commonly used for transmit power control of a plurality of waveforms. When the predetermined parameters are common between a plurality of waveforms, if transmit power control of any waveform is performed at a predetermined timing, the same value may be used for the predetermined parameter.

For both of the first signal and the second signal, the control section 401 may perform transmit power control by using a common correction value based on the TPC command (according to the TPC command), or may perform transmit power control by using a different correction value of each uplink signal (by referring to a different variable).

When a correction value (a cumulative value based on the TPC command) related to one of (one or more) waveforms is reset, the control section 401 may reset correction values related to the other waveforms. Furthermore, when a correction value related to a specific waveform is reset, the control section 401 may reset the correction values related to the other waveforms. In this regard, resetting of the cumulative value may be referred to cumulative reset.

Furthermore, the control section 401 may perform control to compute UPH supposing (assuming) the specific waveform, and transmit the PHR indicating the UPH. The control section 401 may compute the UPH supposing the specific waveform irrespectively of the waveform of the signal that is being transmitted.

The control section 401 may switch the first signal and the second signal in one or a plurality of carriers (CCs). The control section 401 may transmit the first signal in the first carrier, and transmit the second signal in the second carrier. In this case, too, the control section 401 may perform independent transmit power control on each of the first signal and the second signal, or may perform common transmit power control on both of the first signal and the second signal.

Furthermore, when obtaining from the received signal processing section 404 various pieces of information notified from the radio base station 10, the control section 401 may update the parameters used for the control based on the information.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RRSI) or channel information (e.g., CSI). The measurement section 405 may output a measurement result to the control section 401.

(Hardware Configuration) In addition, the block diagrams used to describe the above embodiments illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 10:
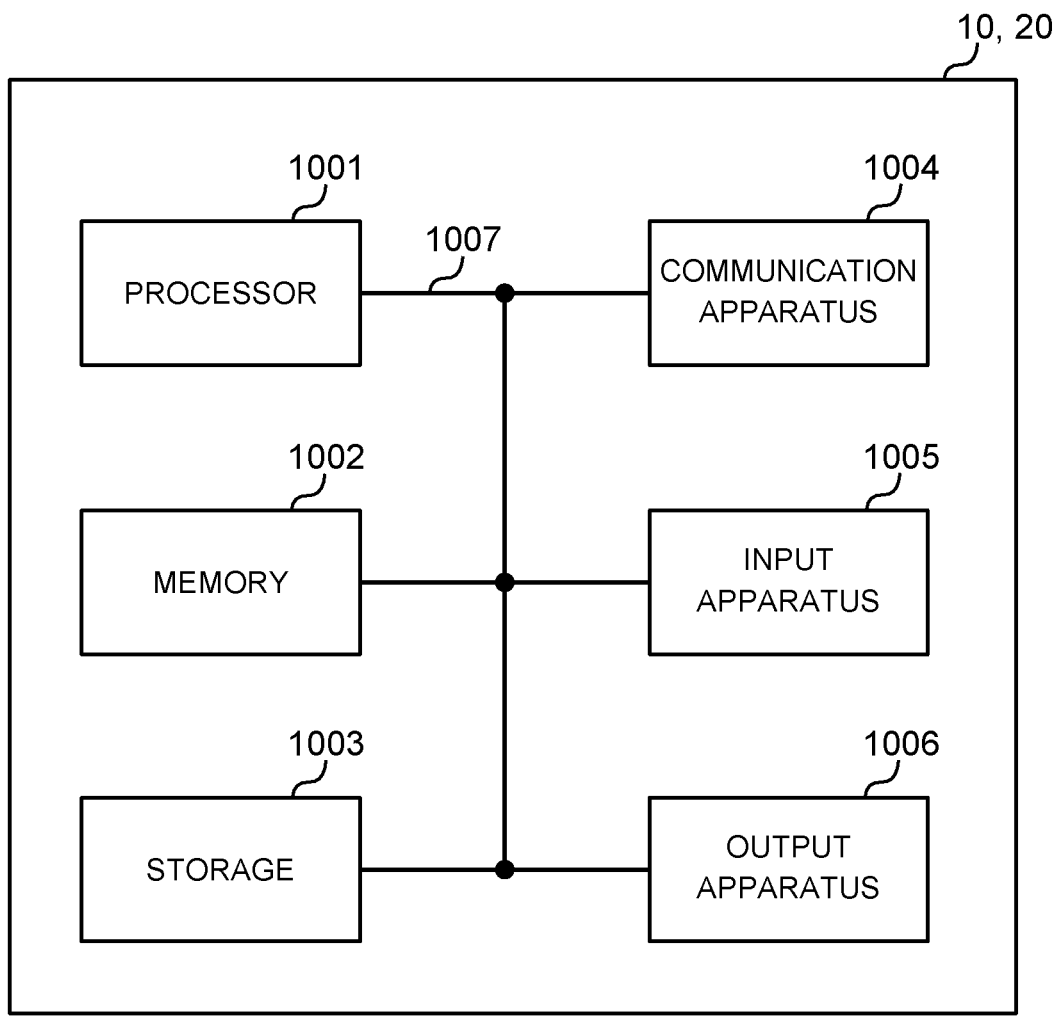
FIG. 10 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 10 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 10 or may be configured without including part of the apparatuses.

For example, FIG. 10 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read predetermined software (program), and thereby causing the processor 1001 to perform an operation, and control communication of the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed of a single bus or may be composed of buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

(Modified Example) In addition, each term that is described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed time duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmit power that can be used by each user terminal) in TTI units to each user terminal. In this regard, a definition of the TTI is not limited to this.

The TTI may be a transmission time unit of a channel-coded data packet (transport block), a code block and/or a codeword or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the time duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, the mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to predetermined values or may be expressed by other corresponding information. For example, a radio resource may be indicated by a predetermined index. Furthermore, numerical expressions that use these parameters may be different from those explicitly disclosed in this description.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of predetermined information (e.g., notification of "being X") may be made not only explicitly but also implicitly (by, for example, not notifying this predetermined information or by notifying another information).

Decision may be performed based on a value (0 or 1) expressed by one bit, may be performed based on a boolean expressed by true or false or may be performed by comparing numerical values (e.g., comparison with a predetermined value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access". It can be understood that, when used in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined by the recitation of the claims. Accordingly, the disclosure of this description intends for exemplary explanation, and does not have any restrictive meaning to the present invention.

This application claims priority to Japanese Patent Application No. 2016-243299 filed on Dec. 15, 2016, the entire contents of which are incorporated by reference herein.

The invention claimed is:

1. A terminal comprising:
a processor that controls transmit power of an uplink signal; and
a transmitter that transmits either of a first uplink signal conforming to a first transmission scheme-based waveform and a second uplink signal conforming to a second transmission scheme-based waveform based on the transmit power,
wherein when the uplink signal is switched between the first uplink signal and the second uplink signal, the processor updates a correction value based on a Transmit Power Control (TPC) command after switching, by using a correction value immediately before the switching.

2. The terminal according to claim 1, wherein the processor controls the transmit power by using permitted maximum transmit power that is different between the first uplink signal and the second uplink signal.

3. The terminal according to claim 1, wherein the processor computes a power headroom based on a signal to transmit.

4. The terminal according to claim 2, wherein the processor computes a power headroom based on a signal to transmit.

5. The terminal according to claim 1, wherein the processor computes a power headroom by using permitted maximum transmit power that is different between the first uplink signal and the second uplink signal.

6. The terminal according to claim 2, wherein the processor computes a power headroom by using permitted maximum transmit power that is different between the first uplink signal and the second uplink signal.

7. The terminal according to claim 3, wherein the processor computes a power headroom by using permitted maximum transmit power that is different between the first uplink signal and the second uplink signal.

8. The terminal according to claim 1, wherein the processor computes a power headroom by using the correction value.

9. The terminal according to claim 2, wherein the processor computes a power headroom by using the correction value.

10. The terminal according to claim 3, wherein the processor computes a power headroom by using the correction value.

11. The terminal according to claim 5, wherein the processor computes a power headroom by using the correction value.

12. The terminal according to claim 1, wherein the first transmission scheme-based waveform corresponds to a Cyclic Prefix Orthogonal Frequency Division Multiplexing (CP-OFDM)-based waveform and the second transmission scheme-based waveform corresponds to a Discrete Fourier Transform Spread Orthogonal Frequency Division Multiplexing (DFT-S-OFDM)-based waveform.

13. A radio communication method for a terminal, comprising:
controlling transmit power of an uplink signal; and
transmitting either of a first uplink signal conforming to a first transmission scheme-based waveform and a second uplink signal conforming to a second transmission scheme-based waveform based on the transmit power,
wherein when the uplink signal is switched between the first uplink signal and the second uplink signal, the terminal updates a correction value based on a Transmit Power Control (TPC) command after switching, by using a correction value immediately before the switching.

14. A system comprising:
a terminal that comprises:
a processor that controls transmit power of an uplink signal; and
a transmitter that transmits either of a first uplink signal conforming to a first transmission scheme-based waveform and a second uplink signal conforming to a second transmission scheme-based waveform based on the transmit power,
wherein when the uplink signal is switched between the first uplink signal and the second uplink signal, the processor updates a correction value based on a Transmit Power Control (TPC) command after switching, by using a correction value immediately before the switching; and
a base station that comprises:
a receiver that receives either of the first uplink signal and the second uplink signal.

* * * * *